(12) United States Patent
Checka

(10) Patent No.: US 9,211,644 B1
(45) Date of Patent: Dec. 15, 2015

(54) SYSTEM AND METHOD FOR INSTRUCTING A DEVICE

(71) Applicant: Neal Checka, Waltham, MA (US)

(72) Inventor: Neal Checka, Waltham, MA (US)

(73) Assignee: Vecna Technologies, Inc., Cambridge, MA (US)

( * ) Notice: Subject to any disclaimer, the term of this patent is extended or adjusted under 35 U.S.C. 154(b) by 76 days.

(21) Appl. No.: 14/062,973

(22) Filed: Oct. 25, 2013

(51) Int. Cl.
| | | |
|---|---|---|
| *G06N 3/00* | (2006.01) | |
| *B25J 9/16* | (2006.01) | |
| *G06F 3/00* | (2006.01) | |
| *G06F 3/01* | (2006.01) | |
| *B25J 11/00* | (2006.01) | |
| *G06K 9/00* | (2006.01) | |

(52) U.S. Cl.
CPC ............ *B25J 9/1697* (2013.01); *B25J 11/0005* (2013.01); *G06F 3/017* (2013.01); *G06N 3/008* (2013.01); *G05B 2219/33051* (2013.01); *G05B 2219/33056* (2013.01); *G05B 2219/35444* (2013.01); *G05B 2219/40391* (2013.01); *G05B 2219/40413* (2013.01); *G05B 2219/40414* (2013.01); *G06K 9/00335* (2013.01)

(58) Field of Classification Search
USPC .................................................. 901/1, 3, 47
See application file for complete search history.

(56) References Cited

U.S. PATENT DOCUMENTS

| | | | | |
|---|---|---|---|---|
| 6,714,840 | B2* | 3/2004 | Sakaue et al. ................ | 700/245 |
| 7,129,927 | B2* | 10/2006 | Mattsson ...................... | 345/158 |
| 8,818,556 | B2* | 8/2014 | Sanchez et al. ............... | 700/253 |
| 8,880,223 | B2* | 11/2014 | Raj et al. ...................... | 700/264 |
| 2002/0165642 | A1* | 11/2002 | Sakaue et al. ................ | 700/245 |
| 2003/0214524 | A1* | 11/2003 | Oka ............................. | 345/700 |
| 2004/0190754 | A1* | 9/2004 | Sakagami et al. ............ | 382/103 |
| 2005/0271279 | A1* | 12/2005 | Fujimura et al. ............. | 382/203 |
| 2006/0184273 | A1* | 8/2006 | Sawada et al. ................ | 700/245 |
| 2006/0293787 | A1* | 12/2006 | Kanda et al. ................. | 700/245 |
| 2007/0146371 | A1* | 6/2007 | Dariush ........................ | 345/474 |
| 2007/0198128 | A1* | 8/2007 | Ziegler et al. ................ | 700/245 |
| 2010/0103106 | A1* | 4/2010 | Chui ............................. | 345/166 |
| 2011/0001813 | A1* | 1/2011 | Kim et al. ..................... | 348/77 |

* cited by examiner

*Primary Examiner* — Jason Holloway
(74) *Attorney, Agent, or Firm* — Albert J. Brunett

(57) ABSTRACT

A system and method of instructing a device is disclosed. The system includes a signal source for providing at least one visual signal where the at least one visual signal is substantially indicative of at least one activity to be performed by the device. A visual signal capturing element captures the at least one visual signal and communicates the at least one visual signal to the device where the device interprets the at least one visual signal and performs the activity autonomously and without requiring any additional signals or other information from the signal source.

15 Claims, 3 Drawing Sheets

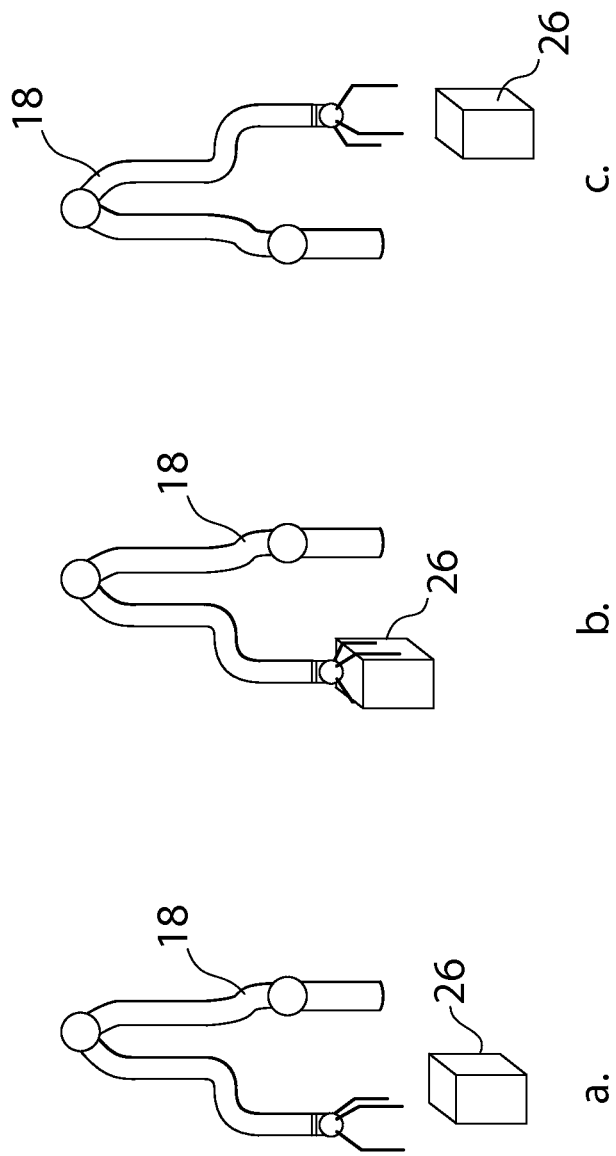

SYSTEM AND METHOD FOR INSTRUCTING A DEVICE

BACKGROUND OF THE INVENTION

1. Field of the Invention

The present invention relates to a system and method for instructing devices such as robots or the like and, more particularly to a system and method for instructing devices without additional human interaction.

2. Background Information

Devices such as robots are used in a variety of applications to perform a number of activities. Techniques for instructing such devices include joystick controllers and the use of complex programming algorithms and software, among others. These existing techniques, however, either require direct, continual supervision or extensive instruction programming.

SUMMARY OF THE INVENTION

A system and method for instructing a device is disclosed. The system includes a signal source for providing at least one visual signal where the at least one visual signal is substantially indicative of at least one activity to be performed by the device. A visual signal capturing element captures the at least one visual signal and communicates the at least one visual signal to the device where the device interprets the at least one visual signal and performs the activity autonomously and without requiring any additional signals or other information from the signal source.

DESCRIPTION OF THE DRAWINGS

The following detailed description will be better understood when read in conjunction with the appended drawings, in which there is shown one or more of the multiple embodiments of the present disclosure. It should be understood, however, that the various embodiments of the present disclosure are not limited to the precise arrangements and instrumentalities shown in the drawings.

FIGS. 3a-c generally illustrate a flow diagram of a device performing an activity in accordance with one embodiment of the invention.

DESCRIPTION OF THE PREFERRED EMBODIMENTS

Figure 1:
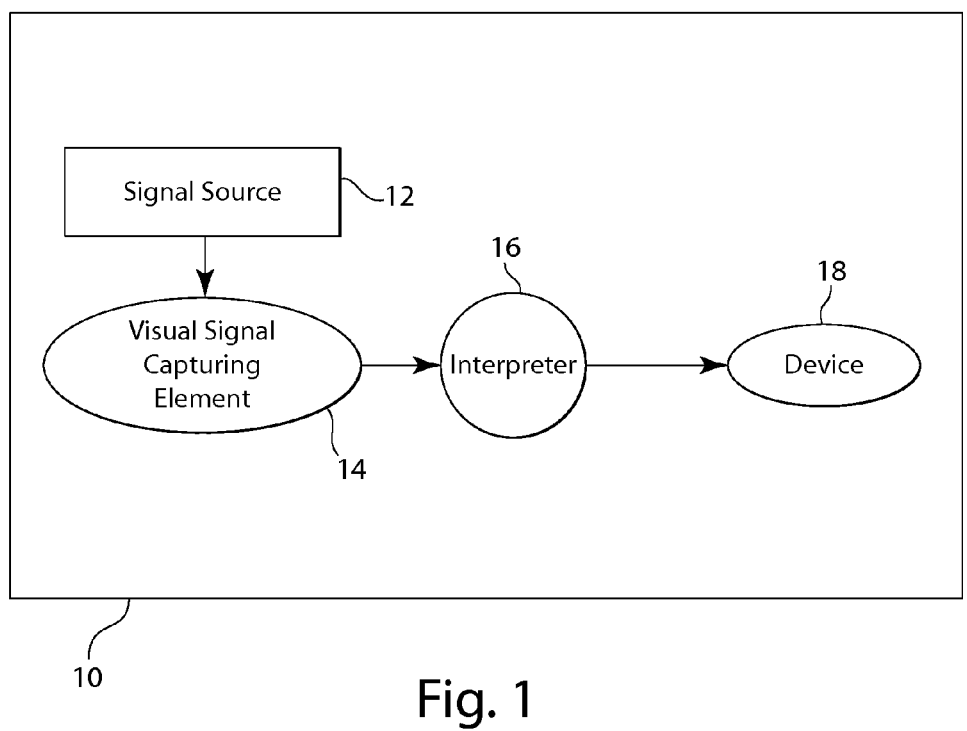
FIG. 1 generally illustrates a block diagram of the system in accordance with one embodiment of the invention.

The present invention will be described in detail with reference to embodiments that represent examples of the present invention and are not intended to limit the scope of the invention. Although specific elements and configurations are described to provide an understanding of the invention, it is to be understood that the specific embodiments, elements and configurations provided are for illustrative purposes only. Other configurations will be recognized by those of ordinary skill in the art without departing from the teachings of the present invention or the scope of the appended claims.

Certain terminology is used herein for convenience only and is not to be taken as a limitation on the present disclosure. In the drawings, the same reference letters are employed for designating the same elements throughout the figures.

The present invention relates to a system and method for instructing a device or the like to perform an activity where a signal source, such as a human or other source, provides a visual signal that substantially indicates an activity that the human wants the device to perform. The visual signal is captured by a visual signal capturing element and then communicated to the device and the device can then perform the activity without any other signals or information.

FIG. 1 generally illustrates a block diagram of the system 10 in accordance with one embodiment of the invention. The system 10 substantially includes a signal source 12, a visual capturing element 14, an interpreter 16, and a device 18.

Briefly, in operation, the signal source 12 provides any number of signals that typically mimic action or motion to be substantially copied by the device 18. The visual signal provided by the signal source 12 is captured by the visual signal capturing element 14.

At least one interpreter 16 may be used to essentially translate the visual signal. The visual signal may be translated such that the device 18 is able to interpret the visual signal and recognize the activity to be performed.

The device 18 is then able to perform the activity autonomously. That is, the device 18 may perform the activity based only on the captured visual signal and without requiring any additional signals or other information from the signal source 12 and without requiring human operation (if the signal source is a human, then no human operation in addition to providing the visual signal is required).

The signal source 12, for example, may include a human hand, other parts of a human's body, or a human's entire body. In addition to humans, the signal source 12 may be any type of mammal, robot, display, or anything else capable of providing a visual signal.

Figure 2:
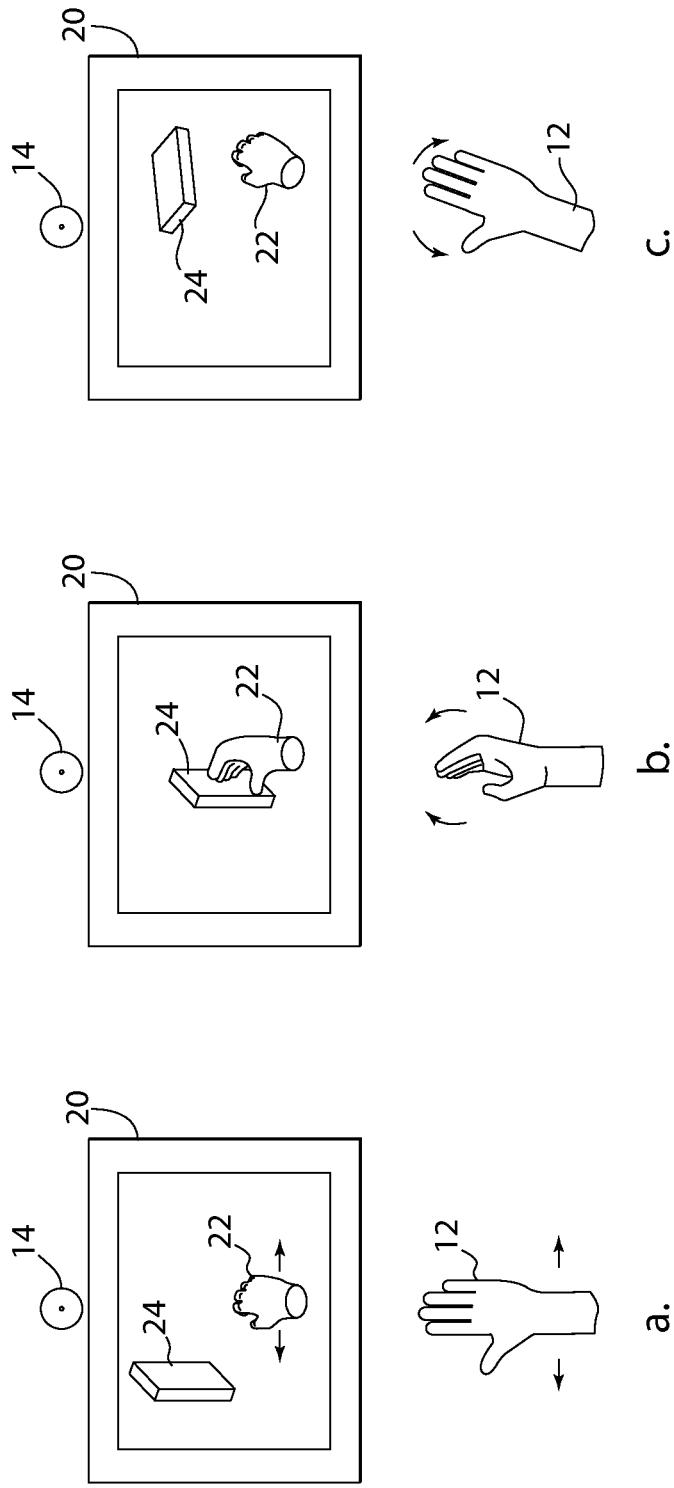
FIGS. 2a-c generally illustrate a flow diagram of a method of providing a visual signal in accordance with one embodiment of the invention.

A display 20 (generally illustrated in FIG. 2) may be used to assist in providing the visual signal. A display may, for example, allow a user to track his or her visual signal in substantially real time.

However, a display may not be required for instructing a device to perform an activity. For example, a signal source 12 such as a human may simply make walking movements (e.g., walking or running in place) as a visual signal that is captured by a visual signal capturing element 14. This may, for example, instruct a device 18 to travel in a certain direction for a certain distance or period of time.

The visual signal capturing element 14 may include at least one camera. If a visual signal in three dimensions is to be captured, a single 3D camera or at least two non-3D cameras (e.g., stereo cameras) may be used. If a visual signal in two dimensions is to be captured, a 3D camera is not necessary and only one non-3D camera may be used. A variety of visual signal capturing elements, known now or hereafter invented, may be used to capture the visual signal.

At least one interpreter 16 may be used to translate and communicate information between at least the visual capturing element 14 and the device 18. In the context of this invention, at least in one embodiment, the interpreter 16 may include a CPU with one or more microprocessors, memory and the like, and capable of executing software that translates and communicates information (e.g., the visual signal) to the device 18. However, anything that is capable of interpreting this type of information may be used as long as it capable of achieving the features of the invention.

The number of and positions of these interpreters 16 may vary, and translations of the visual signal may be done at any of the interpreters 16 or a combination thereof. For example, an interpreter 16 may be configured with the visual capturing element 14 and configured to recognize the significance of the visual signal (e.g., what the activity to be performed is) and to then translate the visual signal accordingly. Therefore, when the device 18 receives the visual signal, the visual signal is in a format in which the device 18 is able to interpret and recognize the activity to be performed.

Alternatively, interpreters 16 may be configured with the device 18, with both the visual capturing element 14 and the device 18, or separate from both the device 18 and the visual capturing element 14 at some remote location, for example. It is contemplated that a wide variety of configurations may be used to provide substantially the same functions as described previously.

The device 18 may include a robot or the like. For example, the device 18 may include an actuator or the like and can include a robotic limb with an arm and a hand. A variety of devices may be used in addition to a robotic limb.

The device 18 may be equipped with one or more sensors (not shown) to inform the device 18 of its environment, among other functions. For example, the sensor may identify an object that the device 18 is to interact with in accordance with the captured visual signal and can be similar to the visual signal capturing element 14 or any other type of sensor, such as infrared, laser or the like.

It is contemplated that the visual signal may be provided at a location entirely separate from where the device is to perform the activity. For example, a user may provide a visual signal that is indicative of an activity to be performed several hundred or thousand miles away, such as in a war zone.

It is also contemplated that the device 18 does not need to wait until the signal source finishes providing the visual signal before performing the activity. That is, the device 18 may be configured to recognize an activity as the signal source 12 is providing the visual signal and to begin performing the activity as the visual signal is being provided.

One method for operating the system of 10 of FIG. 1 is illustrated in FIGS. 2a-c and FIGS. 3a-c. FIGS. 2a-c illustrate the visual signal capturing process of the invention, while FIGS. 3a-c illustrate the device 18 performing the activity in accordance with the visual signal captured in FIGS. 2a-c.

FIG. 2a generally illustrates the signal source 12, illustrated as a human hand. In this embodiment, a display 20 is used to assist in providing the visual signal. The display 20 may show a cursor 22, illustrated as a virtual hand, which may substantially mimic, in substantially real time, the signal source's 12 visual signal. The display 20 may also show virtual objects 24 that represent actual objects in the real world.

For example, assume the activities that a user wants the device 18 to perform are to lift, move, and place an object (such as a container in a factory). A user may refer to the display 20, and particularly the location and orientation of the cursor 22 and virtual object 24 (which may represent the container), to guide his or her movement in providing the visual signal.

FIG. 2b generally illustrates the signal source 12 as making a grab motion. This grab motion may translate to a grab motion of the cursor 22 to in turn grab the virtual object 24. The user may then move their hand (signal source 12) to essentially change the location and orientation of the cursor 22 and, by its association with the cursor 22, the virtual object 24.

FIG. 2c generally illustrates the signal source 12 as making a release motion. This release motion may translate to a release motion of the cursor 22 to in turn release the virtual object 24 at a desired location and into a desired orientation. Although the signal source 12 is illustrated as making a release motion, another grab motion may be made by the signal source 12 which could also translate to a release motion of the cursor 22.

FIG. 3a generally illustrates a device 18 as a robotic actuator with an arm and a hand. Continuing the example in which the activities to be performed are to lift, move, and place an object in accordance with FIGS. 2a-c, FIG. 3a generally illustrates the device 18 in the presence of an actual object 26 (e.g., a container in a factory).

FIG. 3b generally illustrates the device 18 as grabbing the actual object 26. Based on the captured visual signal, the device 18 is generally instructed to move the actual object 26 to a different location or to place the actual object 26 in a different orientation, for example.

FIG. 3c generally illustrates the device 18 as releasing the actual object 26 as generally instructed by the captured visual signal in steps FIG. 2a-c.

Regardless of whether or not a display is used, the way the device 18 performs the activity does not need to be identical to the way the visual signal was captured in doing so. In fact, in some instances it may be difficult for the device 18 to perform the activity in exactly the same way.

For example, in FIG. 2b the cursor 22 is illustrated as grabbing the virtual object 24 from the side (based on the signal source 12). However, the device 18 may be unable to grab the actual object 26 from the side due to size constraints, for example. This is determined by conducting a geometric analysis of the actual object 26 along with knowledge of the device's constraints.

It is therefore desirable for the device 18 to perform the activity in somewhat different ways, such as by grabbing the object 26 in the easiest way possible. For example, the device 18 is shown in FIG. 3b as grabbing the actual object 26 from the top, rather than from the side.

It is also desirable for the device 18 to perform the activity as efficiently as possible to conserve energy, among other goals. Assuming again a device is instructed to lift, move and place an object, one constraint with existing systems is the strict requirement that a device substantially follow an exact path.

The device 18 of this invention, however, does not need to follow the exact path. Instead, the device 18 may recognize only an initial position and a desired final position of the actual object 28 and move the actual object 26 accordingly, while avoiding any obstacles as described in more detail below.

Applicant has been successful in executing the present invention by providing a visual signal by a signal source and communicating the visual signal to a device where the device has successfully performed the activity. The device has been successful in moving an object from a first location to a second location without mimicking the captured visual signal exactly.

This distinction allows for potentially significant control flexibility and energy conservation. For example, the device 18 could move the object along a path that allowed for it to operate near peak efficiency while still performing the assigned activity.

Although allowing for this "activity flexibility" seems relatively straight forward, it is quite complicated, particularly for mobile systems and devices with complex robot arms, and requires a new cutting edge control system that has the ability to take numerous factors into account when automatically planning paths for the device to follow. This type of new control system is known as a Qualitative State Plan (QSP) as described in more detail in Applicant's allowed U.S. patent application Ser. No. 12/731,270 entitled "Task Flexibility for Actuators" the disclosure of which is hereby incorporated by reference.

Briefly, a QSP represents plans with temporal and spatial flexibility for hybrid discrete/continuous systems such as mobile robots, for example. It is to be understood, however, that a QSP can be applied to a variety of applications if desired.

A QSP consists of a sequence of qualitative states which correspond to discrete operating modes of the device. Each qualitative state has an associated set of continuous dynamic characteristics, a set of temporal and spatial goals, and a set of operating constraints.

Using the example of a device needing to lift, move, and place an object, key state variables are positions of device components such as actuators or joints of the device. Temporal goals are useful for specifying that the state be in a goal region at an acceptable time. The execution system must check that the specified temporal constraints are reasonable; that they are consistent with the temporal limitations arising from the dynamics and actuation limits.

Transitions from one qualitative state to another are defined by events. Events represent temporal boundaries that can be restricted by temporal constraints. Goal regions for qualitative states define requirements for transition from one qualitative state to the next. The role of the QSP Executive is to exploit the flexibility in the QSP constraints in order to maximize optimization criteria such as energy efficiency, for example. By configuring the device 18 to perform the activity as efficiently as possible (as opposed to mimicking the visual signal precisely), energy consumption can be minimized.

In analyzing a state space to determine feasible trajectories and optimal control policies, sets of feasible trajectories called "flow tubes" are computed which lead from one qualitative state to another. Multi-Parametric Programming, based on the concept of a Linear Quadratic Regulator, optimally forms state-space regions using convex polytopes and computes optimal control policies for each.

By using multi-parametric programming, combined with a novel temporal constraint compilation technique to compute flow tubes and optimal control policies for devices, goal flexibility can be used to compensate for disturbances (such as impact with the device) and limited actuation.

In the present invention, a similar approach may be employed for the device and goal flexibility can be utilized to maximize energy efficiency as well. The resulting control policy recognizes whether the current system state is valid for achieving the goals, and if so, generates a control and state trajectory from the current state to a goal state that minimizes costs and observes operational constraints.

In addition to achieving energy efficiency, one of the many other features of the invention is the ability of the device 18 to perform the activity without relying on detailed instructions. This is in contrast to a "dumb" robot, which relies on precise, detailed instructions. For example, instructions to this type of dumb robot may be (1) move four inches in the 'x' direction; (2) move four inches in the 'y' direction; (3) open hand; (4) grab object, etc.

The provided visual signal in the context of the invention, on the other hand, essentially serves as the instruction and the device 18 is able to perform the activity based only on the visual signal and without requiring detailed instructions such as those required by a "dumb" robot. This inevitably results in a quicker and easier way to instruct a device such as a robot.

For example, as the device 18 gets its rough or high level instructions from the visual signal to say grasp an object, the device 18 knows what that means and using its logic and sensors searches its current environment for the object to be grasped. Once located, the device 18 figures out how to get to the object, grasp it and move it to the desired location. A variety of approaches can be utilized to assist the device 18 in identifying the object and the space it is in, including GPS positioning, among other approaches.

Although the description above contains many specific examples, these should not be construed as limiting the scope of the embodiments of the present disclosure but as merely providing illustrations of some of the preferred embodiments of this disclosure. Thus, the scope of the embodiments of the disclosure should be determined by the appended claims and their legal equivalents, rather than by the examples given.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the embodiments of the present disclosure.

I claim:

1. A system for instructing a device, comprising:
a signal source configured to provide at least one visual signal where the at least one visual signal is substantially indicative of at least one activity to be performed by the device;
a visual signal capturing element configured to capture the at least one visual signal and to communicate the at least one captured visual signal to the device, where the device is configured to interpret the at least one visual signal and perform the at least one activity autonomously and without requiring any additional signals or other information from the signal source; and
a display configured to assist in providing the visual signal, where the display is configured to show a cursor that substantially mimics in substantially real time the visual signal in a simulated environment with virtual objects, and where the cursor's interactions with the virtual objects indicate the at least one activity to be performed.

2. The system as defined in claim 1 where the visual signal capturing element communicates the at least one visual signal to the device in a format in which the device recognizes the activity to be performed.

3. The system as defined in claim 1 further comprising at least one interpreter, where the at least one interpreter translates the at least one visual to the device in a format in which the device recognizes the activity to be performed.

4. The system as defined in claim 1 where the device is a robot.

5. The system as defined in claim 4 where the robot includes at least one actuator that performs the at least one activity.

6. The system as defined in claim 1 where the device performs the at least one activity without mimicking the visual signal exactly.

7. The system as defined in claim 1 where the device performs the activity efficiently by determining and following feasible trajectories.

8. The system as defined in claim 1 where the at least one activity to be performed by the device includes lifting, moving, and placing an object.

9. The system as defined in claim 1 where the visual signal capturing element includes at least one camera.

10. The system as defined in claim 9 where the at least one camera is capable of capturing visual signals in three dimensions.

11. The system as defined in claim 1 where the device begins to perform the activity while the visual signal is being provided by the signal source.

12. The system as defined in claim 1 where the device performs the at least one activity at a location remote from the signal source.

13. A method of instructing a device, comprising:
- providing at least one visual signal by a signal source, where the at least one visual signal is substantially indicative of at least one activity to be performed by the device;
- providing a visual signal capturing element configured to capture the at least one visual signal;
- communicating the at least one visual signal from the visual signal capturing element to the device, where the device interprets the at least one visual signal and performs the at least one activity autonomously and without requiring any additional signals or other information from the signal source; and
- providing a display configured to assist in providing the visual signal, where the display is configured to show a cursor that substantially mimics in substantially real time the visual signal in a simulated environment with virtual objects, and where the cursor's interactions with the virtual objects indicate the at least one activity to be performed.

14. The method as defined in claim 13 where the device is a robot.

15. The method as defined in claim 13 further comprising determining and following feasible trajectories to perform the activity efficiently.

* * * * *